(12) United States Patent
Ross et al.

(10) Patent No.: US 9,684,715 B1
(45) Date of Patent: Jun. 20, 2017

(54) AUDIO IDENTIFICATION USING ORDINAL TRANSFORMATION

(75) Inventors: David Ross, San Jose, CA (US); Jay Yagnik, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 707 days.

(21) Appl. No.: 13/415,704

(22) Filed: Mar. 8, 2012

(51) Int. Cl.
*G06F 17/30* (2006.01)
*G06F 17/00* (2006.01)

(52) U.S. Cl.
CPC ........ *G06F 17/30743* (2013.01); *G06F 17/00* (2013.01)

(58) Field of Classification Search
CPC .... G06F 17/00; G06F 17/18; G06F 17/30017; G06F 17/3002; G06F 17/30023; G06F 17/30029; G06F 17/3033; G06F 17/30743; G06F 17/30761; G06F 17/30784; G06F 17/30799; G06F 21/10; G06K 9/00; G06K 9/00744; G06K 9/00758; G06K 9/62; G06T 9/002; G06T 9/005; G10H 2210/061; G10L 19/00; G10L 19/018; G10L 25/18; G10L 25/48; G10L 25/51; G10L 25/54; G11B 27/034; G11B 27/28; H04H 20/14; H04H 60/37; H04H 60/372; H04H 60/375; H04H 60/58; H04H 60/59; H04H 60/64; H04H 2201/90; H04L 2209/60; H04N 21/26603; H04N 21/4394; Y10S 707/99933; Y10S 707/99936
USPC .................. 382/100, 181, 190, 224; 700/94; 704/231, 243, 245, 256, 270, 273, 704/E11.001, E11.002; 705/57; 707/737, 707/741, 747, 749, 752, 758, 769, (Continued)

(56) References Cited

U.S. PATENT DOCUMENTS

| 8,158,870 B2 | 4/2012 | Lyon et al. |
| 8,429,216 B2 * | 4/2013 | Eshghi .................... G06F 17/10 382/190 |
| 8,452,106 B2 | 5/2013 | Ke et al. |

(Continued)

OTHER PUBLICATIONS

Ke et al., "Computer Vision for Music Identification" In Proceedings of Computer Vision and Pattern Recognition, 2005 http://www.cs.cmu.edu/~yke/musicretrieval/.*

(Continued)

*Primary Examiner* — Paul McCord
*Assistant Examiner* — Alexander Eljaiek
(74) *Attorney, Agent, or Firm* — Fenwick & West LLP

(57) ABSTRACT

This disclosure relates to audio identification using ordinal transformations. A media matching component receives a sample audio file. The sample audio file can include, for example, a cover song. The media matching component includes a vector component that computes a set of vectors using auditory feature values included in the sample audio file. A hashing component employs a hash function to generate a fingerprint, including a set of sub-fingerprints, for the sample audio file using the set of vectors. The fingerprint is invariant to variations including but not limited to variations in key, instrumentation, encoding formats, performers, performance conditions, arrangement, and/or recording and processing variations. An identification component determines if any reference audio files are similar to the sample audio file using the fingerprint and/or sub-fingerprints, and identifies any similar reference audio files.

22 Claims, 10 Drawing Sheets

(58) Field of Classification Search
USPC ... 707/999.003, 999.006, E17.014, E17.101; 713/176, 180; 725/18, 19; 726/26
See application file for complete search history.

(56) References Cited

U.S. PATENT DOCUMENTS

| | | |
|---|---|---|
| 8,625,033 B1 | 1/2014 | Marwood et al. |
| 2007/0143778 A1* | 6/2007 | Covell et al. .............. 725/19 |
| 2009/0052784 A1* | 2/2009 | Covell et al. .............. 382/209 |

OTHER PUBLICATIONS

U.S. Appl. No. 60/823,881, filed Aug. 29, 2006.*
Stephen Shum, "The Basics of Audio Fingerprinting" Oct. 24, 2011 http://people.csail.mit.edu/sshum/talks/audio_fingerprinting_sls_24Oct2011.pdf.*
Baluja et al., "Waveprint: Efficient Wavelet-Based Audio Fingerprinting" Pattern Recognition, vol. 41, Issue 11, Nov. 2008 http://www.sciencedirect.com/science/article/pii/S0031320308001702#.*
Yagnik et al., "The Power of Comparative Reasoning" International Conference on Computer Vision, IEEE 2011 http://research.google.com/pubs/pub37298.html.*
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.
Shazam, http://www.shazam.com, Last accessed Apr. 24, 2012.
D. Bhat, et al. Ordinal Measures for Visual Correspondence. In CVPR'96. 1996 IEEE.
J. Friedman. An Overview of Predictive Learning and Function Approximation. Technical Report 112, Sep. 1994. Laboratory for Computational Statistics. Department of Statistics, Stanford University. In From Statistics to Neural Networks 1994.
P. Diaconis, et al. Spearman's footrule as a measure of disarray. Stanford, California and Murray Hill, N.J. Received Aug. 1976. Revised Apr. 1977. In J. Roy. Statistical Society 1977.
A. Maturi, et al. A New Weighted Rank Correlation. In J. Mathematics and Statistics, Oct. 1, 2008.
J. Pinto Da Costa, et al. A Weighted Rank Measure of Correlation. In Australian New Zealand Journal of Statistics 47(4), 2005, 515-529.
G. Shieh. A weighted Kendall's tau statistic. In Statistics & Probability Letters 39 (1998) 17-24.
M. Ozuysal, et al. Fast Keypoint Recognition in Ten Lines of Code. In CVPR 2007.
Y. Lifshits, et al. Combinatorial Algorithms for Nearest Neighbors, Near-Duplicates and Small World Design. In Soda 2009.
D. Tschopp, et al. Approximate nearest neighbor search through comparisons. In ArXiv preprint Sep. 11, 2009.
K. Eshghi, et al. Locality sensitive hash functions based on concomitant rank order statistics. In 14th ACM SIGKDD Conference on Knowledge Discovery & Data Mining (KDD'08), Aug. 2008. Posting Date Jul. 6, 2008.
A. Broder. On the resemblance and containment of documents. In Sequences 1997.
A. Broder, et al. Min-wise independent permutations. In STOC 1998.
S. Baluja, et al. Boosting Sex Identification Performance. In IJCV 2007.
M. Ozuysal, et al. Feature harvesting for tracking-by-detection. In ECCV 2006.
O. Pele, et al. Robust real time pattern matching using bayesian sequential hypothesis testing. In PAMI 2008.
R. Zabih, et al. Non-parametric local transforms for computing visual correspondence. In ECCV 1994.
V. Lepetit. Keypoint recognition using randomized trees. In PAMI 2006.
P. Indyk, et al. Approximate nearest neighbors: towards removing the curse of dimensionality. In STOC 1998, Dallas, I Texas. ACM 1998.
Y. Weiss, et al. Spectral Hashing. In NIPS 2009.
R. Lin, et al. SPEC Hashing: Similarity Preserving algorithm for Entropy-based Coding. In CVPR 2010.
D. Lowe. Object recognition from local scale-invariant features. Proceedings of the International Conference on Computer Vision, Corfu (Sep. 1999). In IJCV 1999.
B. Wang, et al. Large-scale duplicate detection for web image search. In ICME 2006.
X.J. Wang, et al. Annosearch: Image autoannotation by search. In CVPR 2006.
S. Winder, et al. Picking the best DAISY. In CVPR 2009.
D. Nister, et al. Scalable recognition with a vocabulary tree. In CVPR 2006.
E. Tola, et al. A fast local descriptor for dense matching. CVPR 2008.
E. Tola, et al. Daisy: an Efficient Dense Descriptor Applied to Wide Baseline Stereo. IEEE Transactions on Pattern Analysis and Machine Intelligence, vol. 32, No. 5, May 2010, 815-830. In PAMI 2010.
R.E. Fan, et al. LIBLINEAR: A Library for Large Linear Classification. Journal of Machine Learning Research 9 (2008) 1871-1874.
K. Yu, T. Zhang, Y. Gong: Nonlinear Learning using Local Coordinate Coding. In NIPS 2009.
J. Zhang, et al. Local Features and Kernels for Classification of Texture and Object Categories: A Comprehensive Study. International Journal of Computer Vision 2007.
Notice of Allowance dated May 9, 2014 for U.S. Appl. No. 13/648,511, 24 pages.
Covell, et al., "LSH Banding for Large-Scale Retrieval with Memory and Recall Constraints," IEEE International Conference on Acoustics, Speech and Signal Processing, 2009, 4 pages.
Office Action for U.S. Appl. No. 14/458,387, dated Apr. 24, 2015, 19 pages.
David Hilley et al, "TV Watcher: Distributed Media Analysis and Correlation," Georgia Institute of Technology, 2004, 8 pages.

* cited by examiner

US 9,684,715 B1

AUDIO IDENTIFICATION USING ORDINAL TRANSFORMATION

TECHNICAL FIELD

This disclosure generally relates to audio identification, and in particular to systems and methods that facilitate identifying audio content using ordinal transformations.

BACKGROUND

Internet media sharing enables users to share media content virtually anywhere at any time, as long as they have access to a media capable device with an internet connection. The convenience of being able to view media content via the internet, essentially on demand, has resulted in explosive growth of internet media viewing. Internet media traffic is currently near a majority of consumer internet traffic, and the rate of demand is projected to continue increasing.

People have the ability to quickly identify or recognize known media content that has undergone a transformation, such as a popular song that has been slowed down, or when a person other than an original artist is covering a known song in a user created video or audio recording. However, transformations of media content such as performance variations have proven difficult and computationally expensive for computer recognition systems.

Typically, conventional systems for media content matching extract features from the media content with fixed reference frames. The fixed reference frames cause the extracted features to be brittle when subjected to various transformations. In addition, typical techniques for media content matching are often not robust enough to handle significant performance variations. As a result, many conventional systems for media matching experience performance degradation when the media content is subject to transformations and/or significant performance variations.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for audio identification using ordinal transformations are disclosed. In one embodiment, a media matching component receives a sample audio file. The sample audio file can include, for example, a cover song. The media matching component includes a vector component that computes a set of vectors using auditory feature values (auditory feature value vectors or vectors) included in the sample audio file. A hashing component employs a hash function to generate a fingerprint of the sample audio file using the set of vectors. The fingerprint includes a set of sub-fingerprints corresponding to respective vectors in the set of vectors, and is invariant to variations in key, instrumentation, encoding formats, performers, performance conditions, arrangement, and/or recording and processing variations. An identification component determines whether there are zero or more reference audio files similar to the sample audio file using the fingerprint and/or sub-fingerprints, and identifies the similar reference audio files.

In an embodiment, a vector component computes a set of vectors using auditory feature values included in a sample audio file, a hash component employs a winner take all (WTA) hash function to generate sub-fingerprints corresponding to respective vectors in the set of vectors, and an identification component determines whether there are zero or more reference audio files similar to the sample audio file using the sub-fingerprints, and identifies the similar reference audio files.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
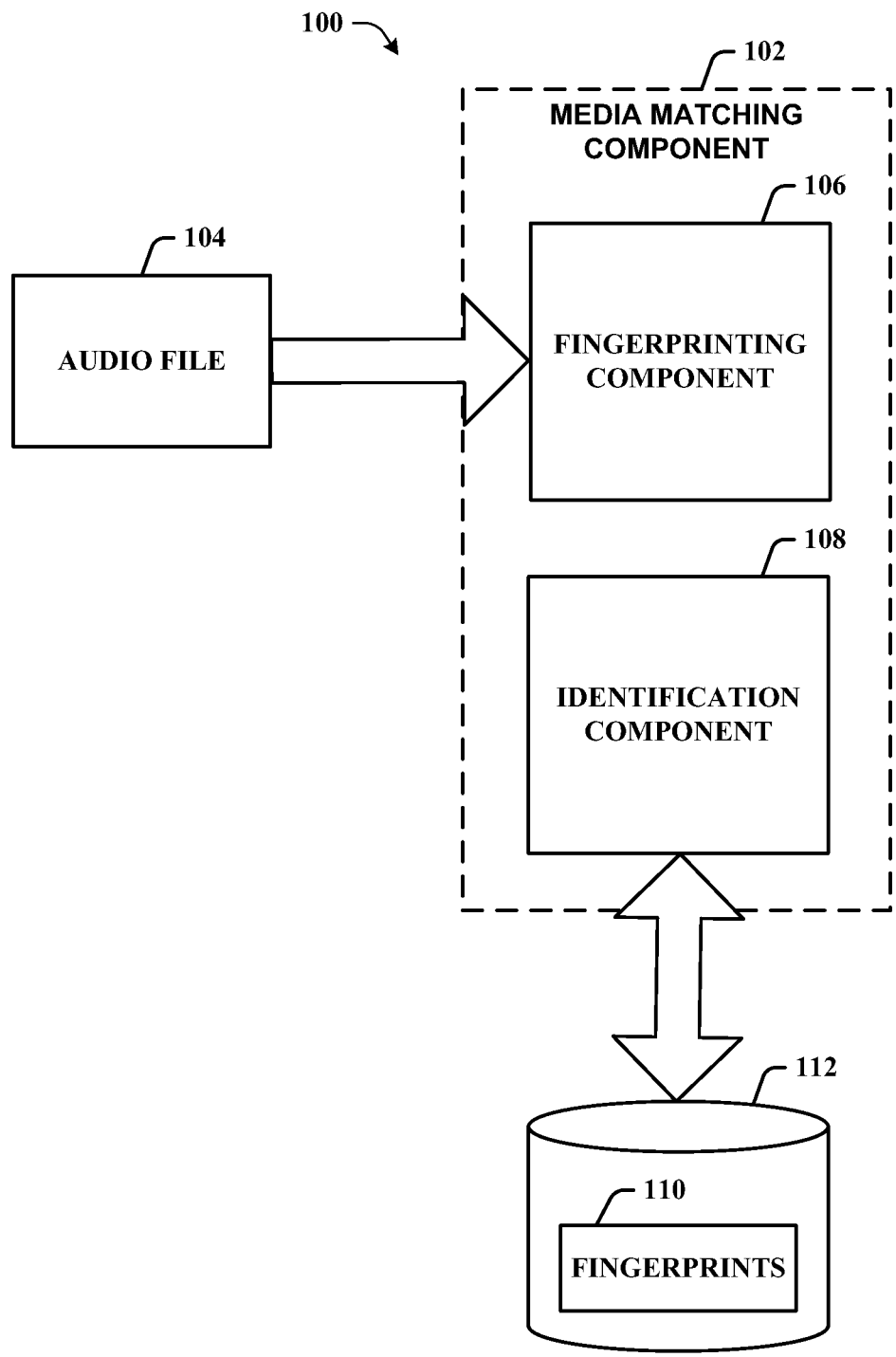
FIG. 1 illustrates an example system for audio identification using ordinal transformations in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, techniques for media content matching that extract features from the media content with fixed reference frames often experience performance degradation when the media content is subject to transformations and/or performance variations. As a consequence, matching media, using such techniques, that has been subject to transformations and/or performance variations can be difficult and computationally expensive.

In accordance with an embodiment a vector component computes a set of vectors using auditory feature values included in a sample audio file, a hash component employs a winner take all hash function to generate a set of sub-fingerprints corresponding to respective vectors in the set of vectors, and an identification component determines whether there are one or more reference audio files similar to the sample audio file using the sub-fingerprints, and identifies the similar reference audio files.

Non-Limiting Examples of Systems for Audio Identification Using Ordinal Transformations Turning now to FIG. 1, illustrated is an example system 100 for audio identification using ordinal transformations in accordance with various aspects described in this disclosure. Generally, system 100 can include a memory that stores computer executable components and a processor that executes computer executable components stored in the memory, examples of which can be found with reference to FIG. 10. System 100 includes a media matching component 102. The media matching component 102 recognizes, identifies, or otherwise determines an identity of a sample audio file 104 (audio file 104) by matching the audio file 104, or a portion of the audio file 104, with known audio content (reference audio files), or a portion of known audio content that is similar to the audio file 104. The audio file 104 can include audio data, such as, songs, speeches, and/or soundtracks. For example, in one implementation, the audio file 104 can include a video performance of a cover song uploaded to a media hosting service by a user, and the media matching component 102 can identify the cover song by determining a set of reference songs (or known songs) that are similar to the cover song. Cover songs include but are not limited to performances of a reference song that feature different performers, instrumentation, performance conditions, and/or arrangements from the reference song. For example, a cover song can include a live performance of a recorded reference song featuring the original performer of the recorded reference song. As an additional or alternative example, a cover song can include a performance of a reference song by a performer other than the original performer.

The media matching component 102 includes a fingerprinting component 106, and an identification component 108. The fingerprinting component 106 determines, provides, or otherwise generates an identifier or fingerprint using auditory features included in the audio file 104. For example, in one implementation, the audio features include melodic characteristics of the audio file 104. The fingerprint is invariant, or sufficiently invariant, to variations in key, instrumentation, encoding formats, performers, performance conditions, arrangement, and/or recording and processing variations.

The identification component 108 determines whether there are zero or more reference audio files similar to the sample audio file, and recognizes, categorizes, or otherwise identifies the reference audio files that are similar to the audio file 104 using the fingerprint generated by the fingerprinting component 106. For example, in one implementation, the identification component 108 compares the fingerprint, or a portion of the fingerprint, for the audio file 104 against a set of fingerprints 110 (or identifiers) for reference audio files, and determines a set of reference audio files that are similar to the audio file 104 (or portion of the audio file) based at least in part on a set of similarity criteria. The similarity criteria can include but are not limited to satisfying a predetermined similarity threshold. As an additional or alternative example, in one implementation, the identification component 108 can employ the fingerprint to lookup reference audio files that are similar to the audio file 104. For instance, the fingerprint can include a set of hash values, and the identification component 108 can employ the set of hash values to lookup a fingerprint in the set of fingerprints 110 for a reference audio file, e.g., using a hash table. It is to be appreciated that although the set of fingerprints 110 are illustrated as being maintained in the data store 112, such implementation is not so limited. For instance, the set of fingerprints 110 can be maintained in another location, and the identification component 108 may access the set of fingerprints 110, for example, via a network connection.

Figure 2:
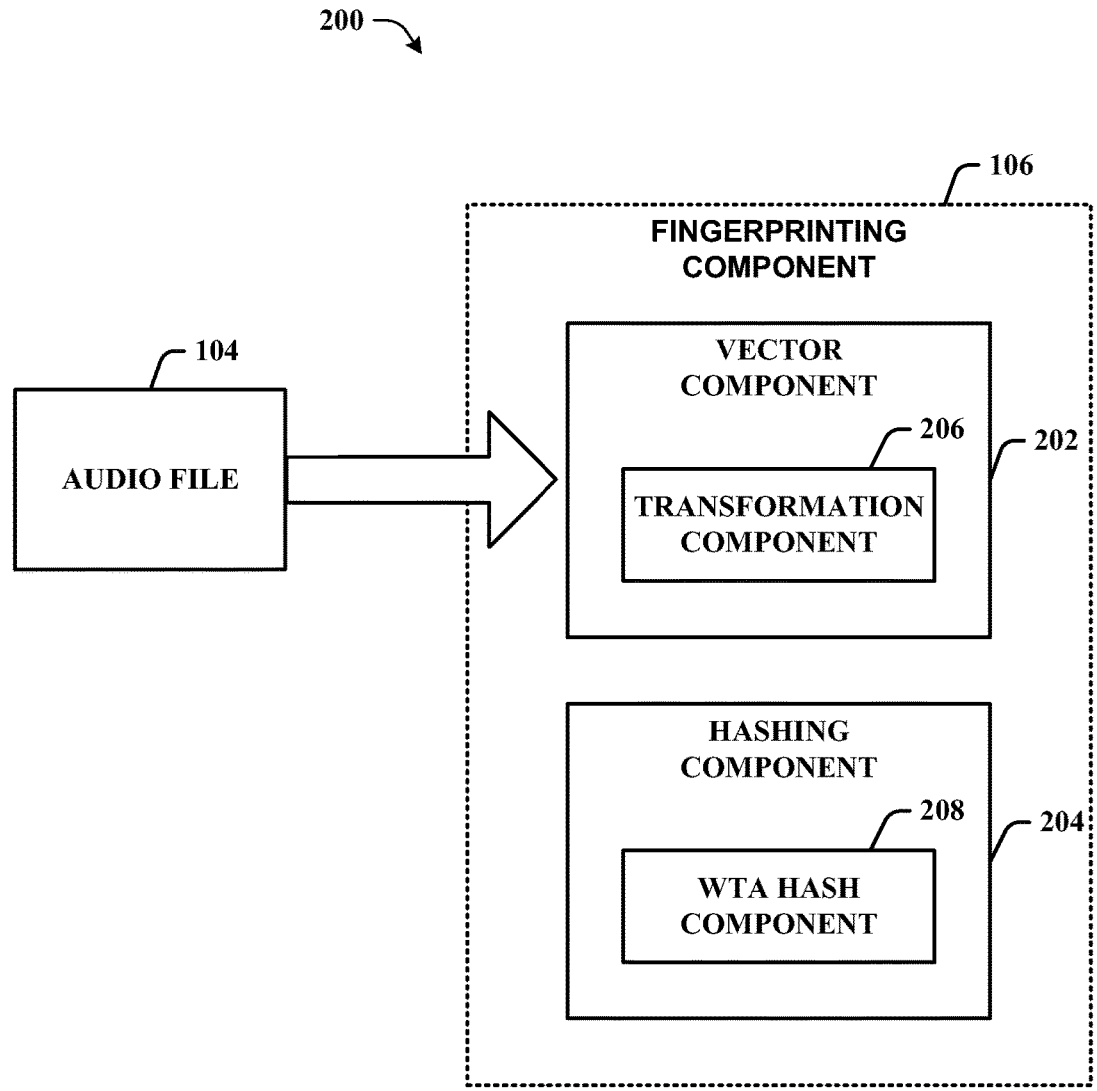
FIG. 2 illustrates an example fingerprinting component in accordance with various aspects described in this disclosure.

FIG. 2 illustrates an example fingerprinting component 106 in accordance with various aspects described in this disclosure. As discussed, the fingerprinting component 106 generates an identifier or fingerprint using auditory features included in the audio file 104. The fingerprinting component 106 in FIG. 2 includes a vector component 202, and a hashing component 204. The vector component 202 determines, generates, or otherwise computes a set of vectors of auditory feature values in the audio file 104, e.g., at a set of predetermined times and/or predetermined time intervals. The set of vectors can include but are not limited to intervalgrams, spectrograms, and/or chromagrams. For example, in one implementation, the vector component 202 computes intervalgrams at predetermined time intervals (e.g., every 0.24 seconds) in the audio file 104 using auditory feature values included in the audio file 104. The vector component 202 can compute the intervalgrams as described in U.S. application Ser. No. 12/826,623 (the '623 application), filed Jun. 29, 2010, titled "Intervalgram Representation of Audio for Melody Recognition." In one implementation, the vector component 202 divides a musical octave at a time interval (current time interval) into a set of bins (e.g., 32 bins). Each of the bins corresponds to a range of musical pitch (e.g., 1/32 of an octave). The vector component 202 computes a strength of each of the musical pitches (e.g., 32 musical pitches) during the current time interval, and generates an intervalgram by comparing the pitch vector at the current time interval with pitch vectors at a set of time intervals immediately preceding the current time interval and a set of pitch intervals immediately succeeding the current time interval. For instance, the vector component 202 can generate the intervalgram by comparing the pitch vector at the current time interval with pitch vectors at 16 time intervals immediately before the current time interval and pitch vectors at 16 time intervals immediately after the current time interval. The comparison is a circular cross correlation between pairs of pitch vectors, which yields a 32-dimensional vector (e.g., an interval vector). The vector component 202 combines the resulting 32 interval vectors of 32-dimensions to generate a 32 by 32 intervalgram for the current time interval.

In one implementation, the vector component 202 includes a transformation component 206. The transformation component 206 executes, implements, or otherwise performs one or more transformations on the set of vectors. The transformations can be designed to improve matching performance. For example, in one embodiment, the set of vectors (e.g., intervalgrams, etc.) can be smoothed by averaging respective vectors included in the set of vectors with a subset of vectors (e.g., 3) preceding the respective vectors. As an additional or alternative example, in one embodiment, an X-dimensional wavelet basis can be applied to vectors included in the set of vectors, where X is an integer. For instance, a two-dimensional Haar wavelet transformation can be applied to each intervalgram included in a set of intervalgrams generated by the vector component 202 for the audio file 104. Smoothing vectors and/or applying an X-dimensional wavelet basis to vectors produces an output having the same format as the vector (e.g., 32 by 32 intervalgram).

The hashing component 204 determines, calculates or otherwise computes a fingerprint for the audio file 104 that includes a set of sub-fingerprints. The sub-fingerprints can be used to lookup reference audio files in a set of hash tables that are similar, or identical, to the audio file 104 (discussed in greater detail with reference to FIG. 3). For example, in one implementation, each sub-fingerprint includes a set of hash values corresponding to a respective vector (e.g., intervalgram, spectrogram, chromagram, etc.) generated by the vector component 202. The hashing component 204 can employ various hash functions in connection with computing the hash values including but not limited to hashing based on random projections, weighted min-wise independent permutations locality sensitive hashing (MinHash), and/or winner takes all (WTA) hashing.

For example, in FIG. 2, the hashing component 204 includes a WTA hash component 208 that transforms an input feature space (e.g., vectors) into binary codes (e.g., hash values) such that a Hamming distance, or Hamming similarity, in a resulting space (e.g., binary codes or hash values) correlates with rank similarity measures. The WTA hash component 208 can permutate the vectors (e.g., intervalgrams, spectrograms, chromagrams, etc.), analyze a first subset of the elements in the respective permutated vectors, and generate the set of hash values (or sub-fingerprint) by coding an index of a maximum element in the respective first subset of elements for the permutated vector (e.g., a K-sized subset of feature dimensions, where K is an integer) (discussed in greater detail with reference to FIG. 5). For example, in one embodiment, the WTA hash component 208 applies the WTA hash function to each intervalgram X times, where X is an integer (e.g., 200). For each application of the WTA hash function, the WTA hash component 208 uses a different permutation (e.g., $\ominus$) included in a set of permutations, and produces a four bit hash for each permutation, resulting in a sub-fingerprint having Y bits (or Y divided by eight bytes), where Y equals X multiplied by four. For instance, where X is 200, the sub-fingerprint has 800 bits (i.e., 200*4) or 100 bytes (i.e., 800/8). For each intervalgram, the WTA hash component 208 employs the same set of permutations (e.g., 200) to generate the sub-fingerprints.

In one implementation, the WTA hash component 208 generates a 4-bit hash as follows. The WTA hash component 208 selects 16 items from a 1024-dimensional input vector, e.g., using a pseudo-random process with a fixed random number seed. The WTA hash component 208 identifies the index of the largest selected item, which will be a number from 0 to 15, and encodes this index using 4-bits, to yield one hash. The WTA hash component 208 can repeat the process using a total of 200 different random number seeds. In one implementation, to reduce the entropy of the resulting hash codes, and increase the frequency of matching, 15 items are selected rather than 16. The WTA hash component 208 encodes the index, which in such implementation is a number from 0 to 14, also using 4 bits.

In addition, the fingerprinting component 106 can generate a fingerprint for the audio file 104 by combining the sub-fingerprints (or hash values) corresponding respectively to different input vectors (e.g., intervalgrams, spectrograms, chromagrams, etc.) for the audio file 104. The size, dimension or length of the fingerprint is generally based on the length of the audio file 104 (e.g., number of sub-fingerprints for the audio file 104).

Figure 3:
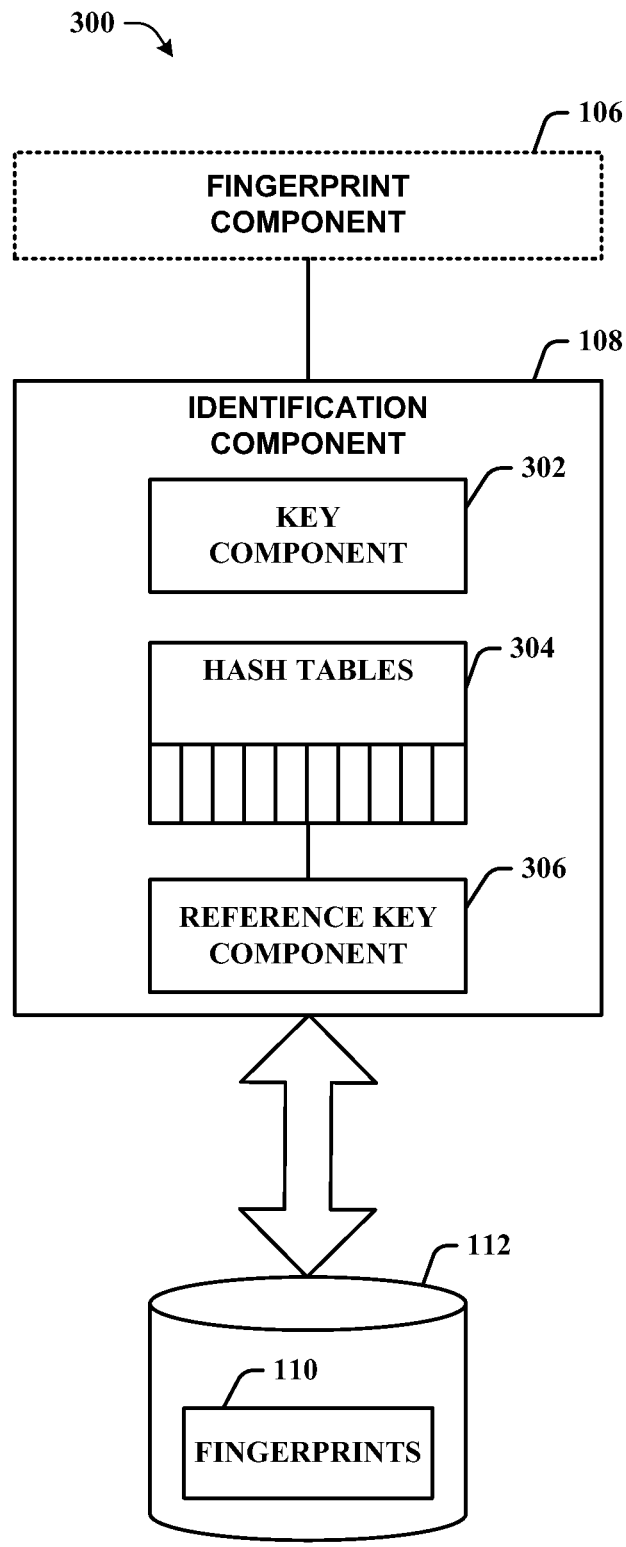
FIG. 3 illustrates an example identification component in accordance with various aspects described in this disclosure.

Referring to FIG. 3, illustrated is an example identification component 108 in accordance with various aspects described in this disclosure. As discussed, the identification component 108 determines whether there are zero or more reference audio files similar to the sample audio file, and identifies the similar reference audio files using the sub-fingerprints generated by the fingerprinting component 106. The identification component 108 in FIG. 3 includes a key component 302, a set of hash tables 304, and a reference key component 306. The key component 302 generates a set of keys using a sub-fingerprint generated by the fingerprint component 106. For example, in one implementation, the key component 302 separates, partitions, or otherwise divides the sub-fingerprint into a set of keys based on a set of key generation criteria. The key generation criteria can include but is not limited to a predetermined quantity of keys or a predetermined key size. For example, the key component 302 can divide a 100-byte sub-fingerprint into a set of 25 four-byte keys (or chunks).

Reference songs are represented by a fingerprint included in the set of fingerprints 110 (e.g., unique identifier). The reference key component 306 generates a set of reference keys for a reference song using a corresponding fingerprint in the set of fingerprints 110, and inserts the reference keys into corresponding hash table bins in the set of hash tables 304. For example, if a first reference song has a key value K for a first hash table, then the first reference song is inserted in bin K in the first hash table. If the first reference song has a key value C for a second hash table, then first reference song is inserted into bin C in the second hash table. The quantity of bins in a hash table in the set of hash tables 304 is equal to a range of possible values of a key. For instance, for a 32-bit key, there can be 2^32 bins.

The identification component 108 indexes respective keys generated by the key component 302 into each of the hash tables included in the set of hash tables 304. For example, a first key (or chunk) can be used to index each of the hash tables 304, a second key (or chunk) can be used to index each of the hash tables 304, and so forth (discussed in greater detail with reference to FIG. 4). As an additional or alternative example, in one implementation, each key (or chunk) is used to index a different hash table, e.g., a first chunk indexes table 0, a second chunk indexes table 1, and so forth. As an example, in one implementation, a fingerprint consists of 100 bytes: [b0, b1, b2, b3, b4, . . . b99]. A key for a first hash table (hash table #0) is made from the first four bytes—key0: [b0, b1, b2, b3]; a key for a second hash table (hash table #1) is made from the second four bytes—key1: [b4, b5, b6, b7]; and so forth such that a key for a twenty-fifth hash table (hash table #24) is key24: [b96, b97, b98, b99]. Accordingly, each bin in hash table #0 will contain a list of song identifiers, indicating reference songs that have at least one fingerprint that have exactly the same first four bytes, and similarly for each of the 25 hash tables.

The identification component 108 determines whether there are one or more reference audio files similar to the sample audio file 104 based on a set of similarity criteria, and identifies the similar reference audio files. The similarity criteria can include but is not limited to satisfying a similarity threshold, wherein the similarity threshold is a predetermined quantity of keys corresponding to a reference song. For example, the identification component 108 can determine reference songs that are similar to the audio file 104, where the audio file 104 has at least X keys corresponding to the respective reference songs (X is an integer) in the set of hash tables 304. For example, for each hash table key of an audio file 104, the identification component 108 can retrieve a list of reference hash table keys from the corresponding hash tables. Each key in the result set indicates that the audio file sub-fingerprint and the reference sub-fingerprint match in at least four bytes. To enforce a higher matching threshold, in one implementation, reference keys that appear in less than four of the hash bins (i.e. match in less than 16 bytes of the 100-byte sub-fingerprint) are discarded. Accordingly, for each sub-fingerprint of the audio file 104, the identification component 108 determines a list of reference songs with approximately matching sub-fingerprints.

Figure 4:
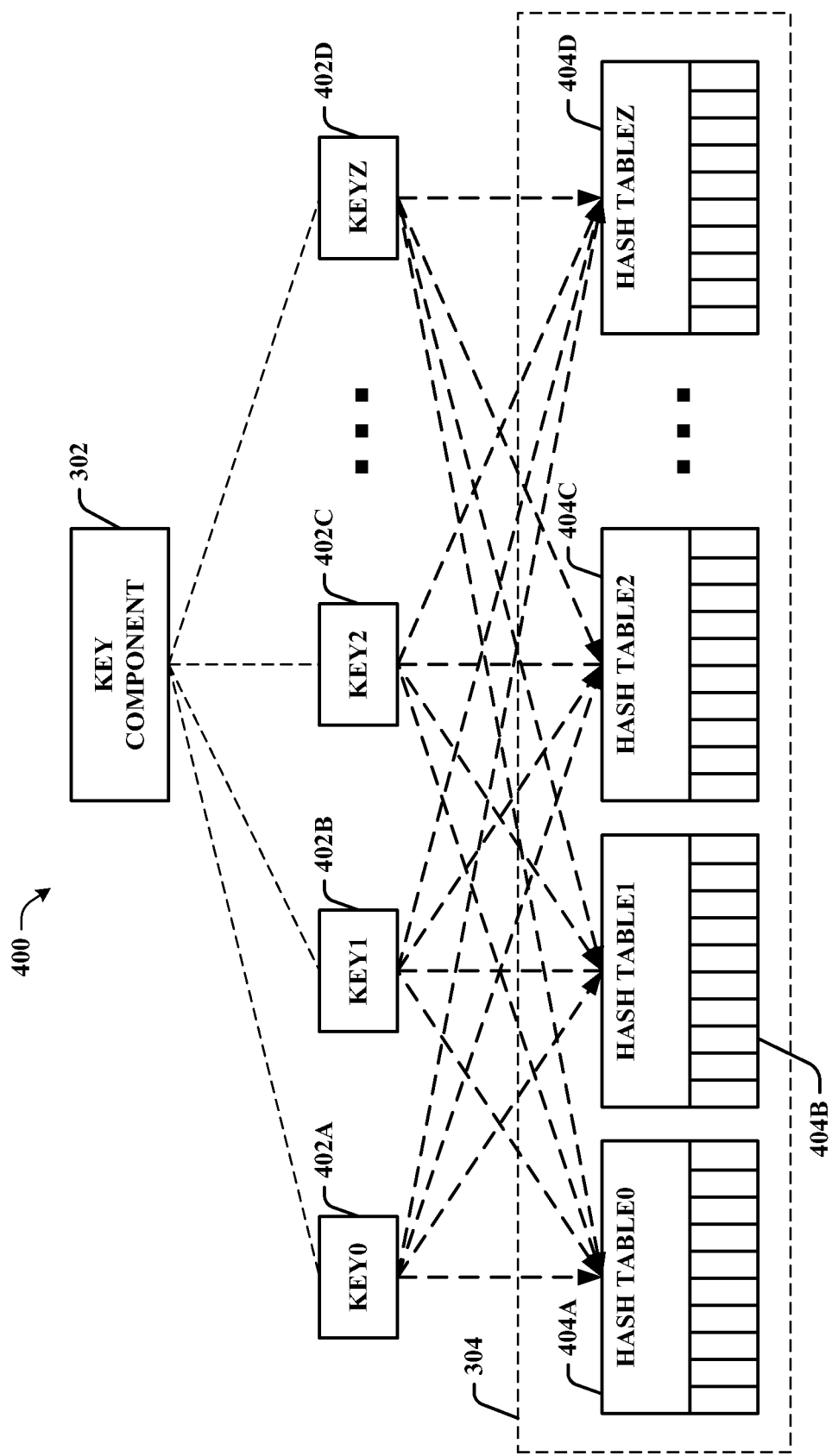
FIG. 4 illustrates a system that provides a non-limiting example of audio identification using ordinal transformations in accordance with various aspects described in this disclosure.

FIG. 4 illustrates a system 400 that provides a non-limiting example of audio identification using ordinal transformations in accordance with various aspects described in this disclosure. The system 400 includes a key component 302 and a set of hash tables 304. As discussed, the key component 302 generates a set of keys 402 (e.g., 402A-402D) using a sub-fingerprint generated by a fingerprint component 106. For example, in one implementation, the key component 302 divides the sub-fingerprint into the set of keys 402 based on a set of key generation criteria, including but not limited to a predetermined quantity of keys or a predetermined key size. For example, in one implementation, the key component 302 divides the sub-fingerprint into a set of Z keys, where Z is an integer. For instance, the key component 302 can divide a 100-byte sub-fingerprint into a set of 25 four-byte keys.

The keys 402 are indexed into hash tables 404 (e.g., hash tables 404A-404D) in the set of hash tables 304. The audio file 104 is determined as being similar to one or more reference songs, if any, based on a set of similarity criteria. The similarity criteria can include but is not limited to satisfying a similarity threshold. The similarity threshold can include a predetermined quantity of keys corresponding to a reference song. For example, in one implementation, the identification component 108 can determine a reference song is similar to the audio file 104 based on the audio file 104 having at least X keys corresponding to the reference song (X is an integer) in the hash tables 404 (e.g., hash tables 404A-404D). Additionally or alternatively, the similarity criteria can include having a quantity of N sub-fingerprints that match a reference song, where a sub-fingerprint matches a reference song if a set of M consecutive keys match, where N and M are integers. For instance, N can be a quantity of sub-fingerprints corresponding to a thirty-second interval of the audio file 104.

Figure 5:
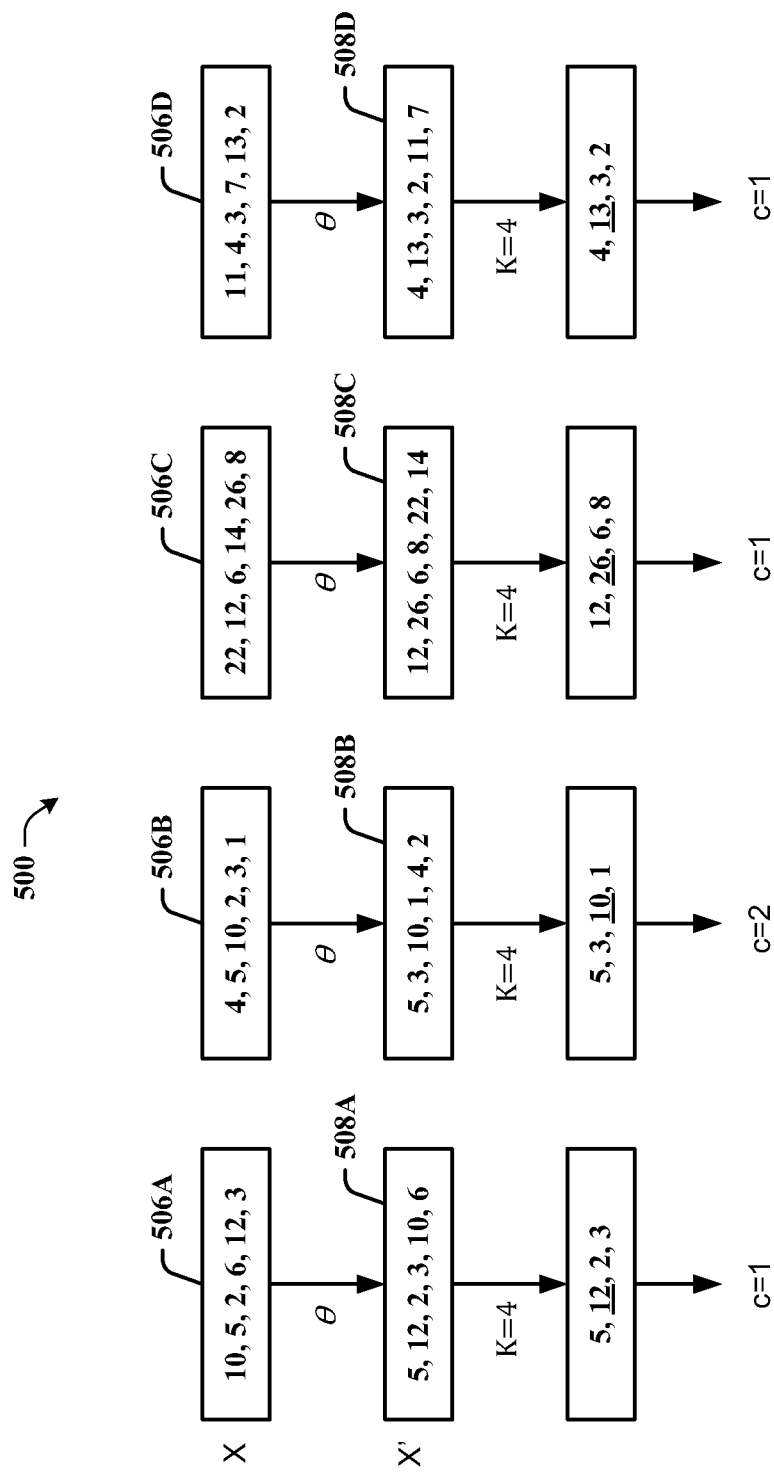
FIG. 5 illustrates an example of winner takes all (WTA) hashing in accordance with various aspects described in this disclosure.

FIG. 5 illustrates illustrated is an example of winner takes all (WTA) hashing 500 in accordance with various aspects described in this disclosure. As discussed above, the WTA hash component 208 transforms an input feature space into binary codes such that a Hamming distance in a resulting space correlates with rank similarity measures. Rank similarity measures provide stability to perturbations in numeric values, and provide good indications of inherent similarity, or agreement, between items or vectors being considered. A non-limiting example WTA hashing algorithm, as employed by the WTA hash component 208, is detailed by Algorithm 1, shown below:

---
WTA Hash
(ALGORITHM 1)

Input: A set of m Permutations Θ, window size K, input vector X.
Output: Sparse vector of codes $C_X$.
  1. For each permutation $\theta_i$, in Θ.
    (a) Permutate elements of X according to $\Theta_i$, to get X'.
    (b) Initialize $i^{th}$ sparse code $c_{xi}$ to 0.
    (c) Set $c_{xi}$ to the index of maximum value in X'(1 ... K)
      i. For j = 0 to K − 1
        A. If X'(j) > X'($c_{xi}$) then $c_{xi}$ = j.
  2. $C_X$ = [$c_{x0}$, $c_{x1}$, ..., $c_{xm-1}$], C contains m codes, each taking a value between 0 and K − 1.

---

Algorithm 1 provides a feature space transformation having a resulting space that is not sensitive to the absolute values of the feature dimensions, but rather on the implicit ordering defined by those values. In effect, the similarity between two points is defined by the degree to which their feature dimension rankings agree. A pair-wise order measure can be defined according to Equation 1 below:

$$PO(X, Y) = \sum_i \sum_{j<i} T((x_i - x_j)(y_i - y_j)) \quad \text{(Equation 1)}$$

where $x_i$ and $y_i$ are the $i^{th}$ feature dimensions in X, Y∈$R^n$ and T is a threshold function, $$T(x) = \begin{cases} 1 & x > 0 \\ 0 & x \leq 0 \end{cases}.$$

Equation 1 measures the number of pairs of feature dimensions in X and Y that agree in ordering. By regrouping the pair-wise summations with respect to ranks, then the pair-wise order function PO can be rewritten in the following form:

$$PO(X, Y) = \sum_i R_i(X, Y) \quad \text{(Equation 2)}$$

where $$R_i(X,Y) = |L(X,i) \cap L(Y,i)| \quad \text{(Equation 3)}$$

$$L(X,i) = \{j | X(i) > X(j)\} \quad \text{(Equation 4)}$$

Equation 2 groups pair-wise agreement terms by one of the indices in the pair. $R_i(X, Y)$, in Equation 3, measures the ranking agreement for index i with indices that rank below i. Indices of elements in X that are ranked below index I are denoted with L(X, i), in Equation 4. The rank agreement at index i is the cardinality of the intersection of the corresponding L sets from X and Y. For example, to compute PO(X, Y) between a first input vector 506A and a second input vector 506B in the WTA hash 500, the term $R_0(X, Y)$ will measure the size of the intersection for the set of indices smaller than index 0. L(X, 0)={1, 2, 3, 5} are the set of indices in the first input vector 506A that have values smaller than that at index 0, similarly for Y, L(Y, 0)={3, 4, 5} which gives L(X, i)∩L(Y, i)={3, 5} leading to $R_0(X, Y)$=2. Equation 2 rearranges the unique pair-wise summations into intersections of these "less than" lists. The inner summation instead of covering all j<i, now covers all j such that X(j)<X(i), and the result is the same since in both cases the unique pairs (i, j) are covered.

Algorithm 1 outlines a transformation method where the permutations in the algorithm are generated randomly and stored for use by all data points. The transformation method depends on coding multiple partial orderings of a data point as a way to lower bound ranking agreement in case of a match. Essentially, K dimensions are selected from the sample, and the dimension with the highest value in the subset of size K is coded. For example, K can be selected at random and consistent across all samples which gives rise to the notion of permutations.

Equality in the codes $c_i$ implies that the estimate of Equation 1 can or possibly should be increased by K−1. If two vectors X and Y have the same value for output code $c_0$, for example, $c_0$=a, for a window size of K, then X and Y match in K−1 inequalities that state X'(a)>X'(i) and Y'(a)>Y'(i) for all i: 0≤i<K, i≠a. So $T((x'_a-x'_i)(y'_a-y'_i))$=1 for all i: 0≤i<K, i≠a which results in a progressively lower bound on a pair-wise order agreement (e.g., Equation 1) between X and Y as more codes match. This is colloquially referred to as a winner takes all (WTA) hash function, because only the "winner" is being encoding in each subset according to a predetermined criterion (e.g., maximum value). It is to be appreciated that although Algorithm 1 is described with reference to the "winner" being a maximum value, such implementation is not limited. For instance, the "winner" can be an additional or alternative encoding of multiple points based on a partial ordering.

The example WTA hashing 500 includes four six dimensional input vectors (506A-506D), where K=4, ⊖=(1, 4, 2, 5, 0, 3). The first input vector 506A and the second input vector 506B are unrelated and result in different output codes (e.g., 1 and 2, respectively). The input third vector 506C is a scaled and offset version of the first input vector 506A (in this case, times 2, then plus 2), and results in the same output code as 506A (e.g., 1). The fourth input vector 506D is a version of the first input vector 506A, wherein each element has been perturbed by 1 (in this case, +1, −1, +1, +1, +1, −1). The elements of the fourth input vector 506D are ranked differently from the first input vector, but the index of the maximum element of the first K (e.g., 4) elements in the fourth input vector 506D (e.g., 1) is the same as the index of the maximum element of the first K (e.g., 4) elements in the first input vector 506A (e.g., 1).

The vectors 506A and 506C satisfy three inequalities, namely X'(1)>X'(0), X'(1)>X'(2), and X'(1)>X'(3). When computing pair-wise order agreement between the vectors 506A and 506C (e.g., Equation 1), these three terms (e.g., inequalities) will add positive contribution. This implies that equality in code $c_i$ adds K−1 to an estimate of PO in Equation 1, effectively acting as a lower bound. If a large number of codes are generated, then the bound becomes tighter as more possible pair combinations are considered.

Furthermore, it can be appreciated that the choice of K leads to different emphasis on pair-wise agreements for indices at the head of the list. For example, consider the degenerate case in which K=n, where n is the dimensionality of the feature vector. Every permutation encodes the global max element, so n−1 inequalities that relate the max element to all the others would be captured. (In general each permutation encodes K−1 inequalities relating to the max within the first K elements of that permutation.) Therefore, K=n puts complete emphasis on the head of the list. In comparison, K=2 does not put bias on the head as all pairs are encoded. Values of K between 2 and n lead to a progressively steeper bias to the head elements.

Figure 6:
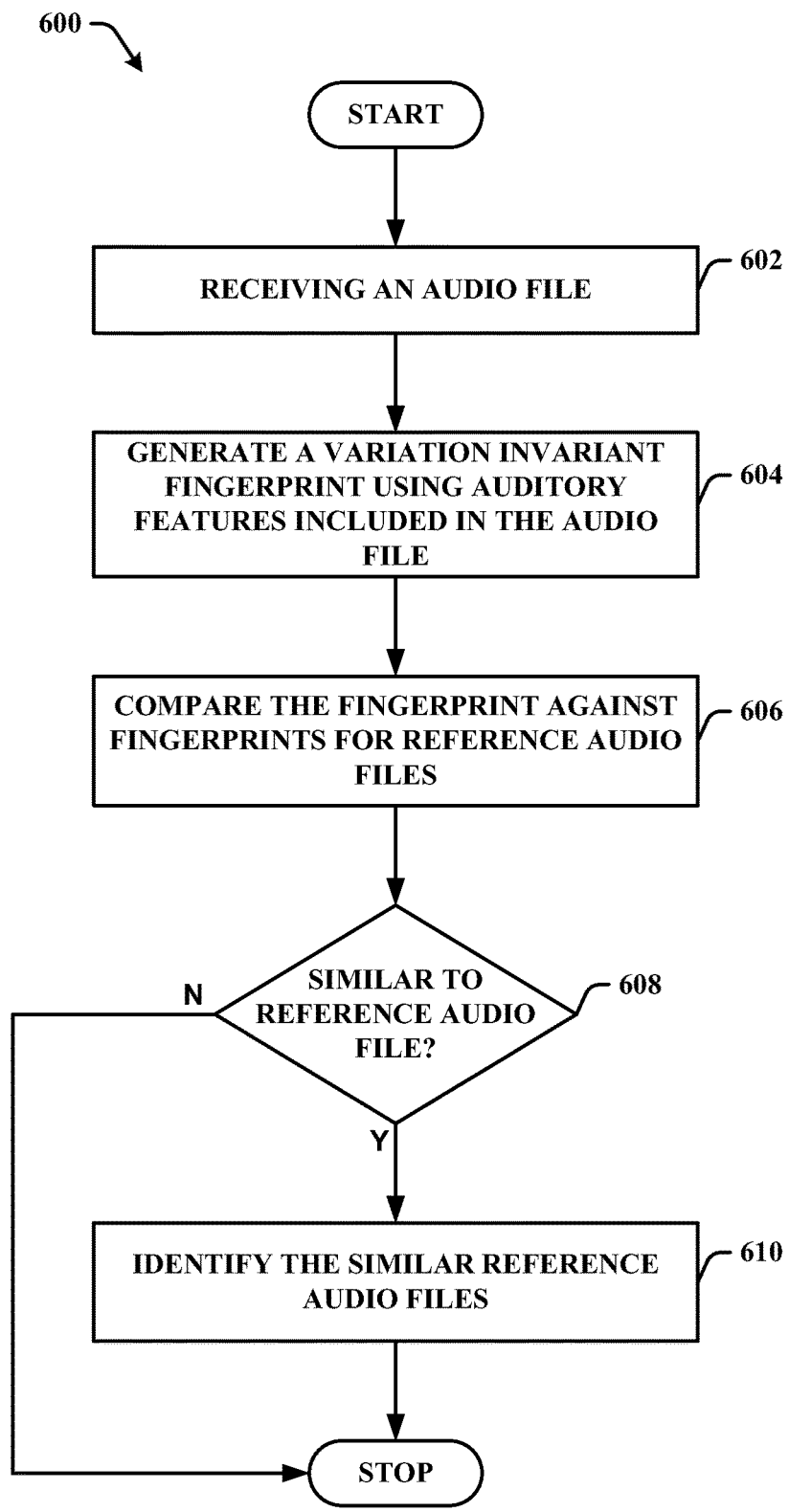
FIGS. 6-8 are example flow diagrams of respective methods for audio identification using ordinal transformations in accordance with various aspects described herein.
Figure 7:
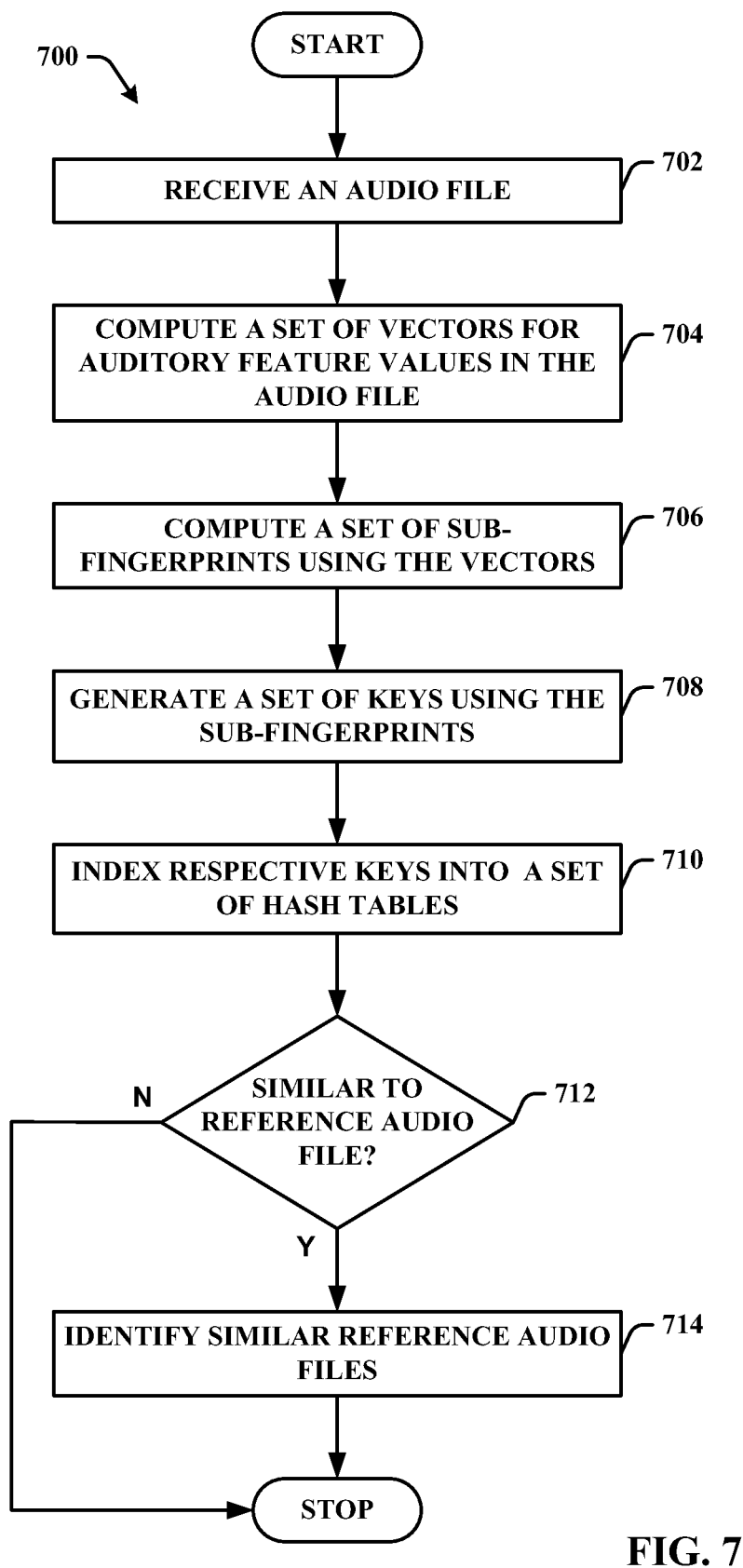
Figure 8:
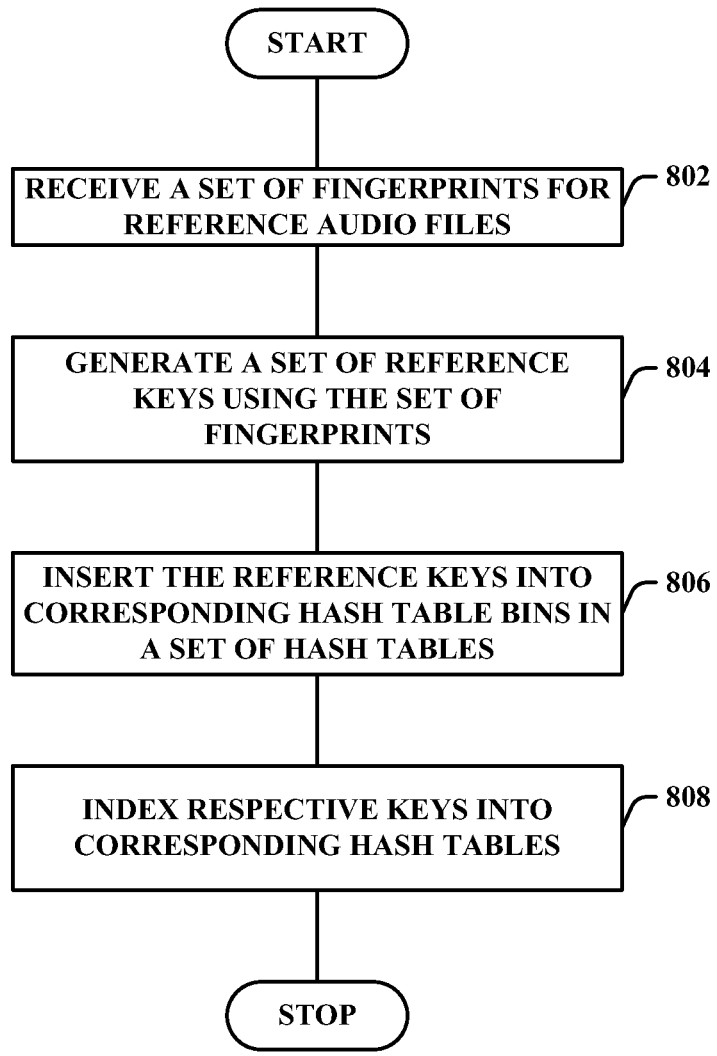

Non-Limiting Examples of Methods for Audio Identification Using Ordinal Transformations FIGS. 6-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, illustrated is an example methodology 600 for audio identification using ordinal transformations in accordance with various aspects described in this disclosure. At reference numeral 602, an audio file is obtained, acquired, or otherwise received (e.g., using the media matching component 102). The audio file can include audio data, such as, songs, speeches, and/or soundtracks. For example, the audio file can include a cover song. Cover songs include but are not limited to performance variations of a reference song that includes different performers, instrumentation, performance conditions, and/or arrangements from the reference song.

At reference numeral 604, a fingerprint (e.g., a set of sub-fingerprints) of the audio file is generated using auditory features included in the audio file (e.g., using the fingerprinting component 106). For example, in one implementation, the auditory features include melodic characteristics of the audio file. The fingerprint is invariant or effectively invariant to variations including but not limited to variations in key, instrumentation, encoding formats, performers, performance conditions, arrangement, and/or recording and processing variations.

At reference numeral 606, the fingerprint, or a part of the fingerprint (e.g., a sub-fingerprint), generated for the audio file is compared against fingerprints, or parts of fingerprints, for reference audio files (known audio files or known songs) (e.g., using the identification component 108). In one implementation, the fingerprint or a part of the fingerprint (e.g., a sub-fingerprint) is used to lookup reference audio files (e.g., using the identification component 108). For instance, the fingerprint can include a set of hash values, and the hash values can be used to lookup a reference audio file using a hash table.

At reference numeral 608, a determination is made whether there are zero or more reference audio files similar to the sample audio file (e.g., using the identification component 108) based on a set of similarity criteria. The similarity criteria can include but is not limited to having a quantity of keys corresponding to a reference audio file. For example, in one embodiment, it may be determined that there are no reference audio files satisfying the set of similarity criteria. As an additional or alternative example, in one embodiment, it may be determined a plurality of reference audio files satisfy the set of similarity criteria. If it is determined that there are one or more similar reference audio files (Y at reference numeral 608), then at reference numeral 610, the similar reference audio files are identified.

Returning to reference numeral 608, if it is determined that there are no similar reference audio files (N at reference numeral 608), then the methodology terminates.

FIG. 7 illustrates an example methodology 700 for audio identification using ordinal transformations in accordance with various aspects described in this disclosure. At reference numeral 702, an audio file is obtained, acquired, or otherwise received (e.g., using the media matching component 102). The audio file can include audio data, such as, songs, speeches, and/or soundtracks. For example, the audio file can include a performance of a famous speech or a cover song. At reference numeral 704, a set of vectors of auditory feature values in the audio file are determined at a set of predetermined times and/or predetermined time intervals (e.g., using the vector component 202). For example, in one implementation, a musical octave at a current time interval is divided into a set of bins (e.g., 32 bins), each corresponding to a range of musical pitch (e.g., 1/32 of an octave). A strength of each of the musical pitches (e.g., 32 musical pitches) during the time current interval is computed, and an intervalgram is generated by comparing the pitch vector at the current time interval with pitch vectors at a set of time intervals immediately preceding the current time interval and a set of pitch intervals immediately succeeding the current time interval. For instance, the intervalgram can be generated by comparing the pitch vector at the current time interval with pitch vectors at 16 time intervals immediately before the current time interval and pitch vectors at 16 time intervals immediately after the current time interval. The comparison is a circular cross correlation between pairs of pitch vectors, which yields a 32-dimensional vector (e.g., an interval vector). The resulting 32 interval vectors of 32-dimensions are combined to generate a 32 by 32 intervalgram for the current time interval.

In addition, one or more transformations can be performed on the set of vectors (e.g., using the transformation component 206). For example, in one embodiment, the set of vectors (e.g., intervalgrams, spectrogram, chromagrams, etc.) can be smoothed by averaging a vector included in the set of vectors with a subset of vectors (e.g., 3) preceding the vector. As an additional or alternative example, in one embodiment, an X-dimensional wavelet can be applied to vectors included in the set of vectors, where X is an integer. For instance, a two-dimensional Haar wavelet can be applied to each intervalgram included in a set of intervalgrams for the audio file. Smoothing vectors and/or applying an X-dimensional wavelet basis to vectors produces an output having the same format as the vector (e.g., a 32 by 32 intervalgram).

At reference numeral 706, a set of sub-fingerprints are computed, generated or otherwise determined that include hash values corresponding to respective vectors (e.g., using the hashing component 204). For example, in one implementation, a winner takes all hashing (e.g., using the WTA hash component 208) is applied to each vector (e.g., a intervalgram, spectrogram, chromagram, etc.) to transform the input feature space into binary codes (or hash values) such that a Hamming distance, or Hamming similarity, in a resulting space (e.g., binary codes or hash values) correlates with rank similarity measures (discussed in greater detail with reference to FIG. 5).

At reference numeral 708, a set of keys is generated using the sub-fingerprints (e.g., using the key component 302). For example, in one implementation, the sub-fingerprints are divided into a set of keys based on a set of key generation criteria, which can include but is not limited to a predetermined quantity of keys or a predetermined key size. For instance, a 100-byte sub-fingerprint can be divided into a set of 25 four-byte keys. At reference numeral 710, the respective keys are indexed into hash tables included in a set of hash tables (e.g., using the identification component 108). At reference numeral 712, a determination is made whether there is at least one reference audio files similar to the sample audio file (e.g., using the identification component 108) based on a set of similarity criteria. The similarity criteria can include but is not limited to having a quantity of keys corresponding to a reference audio file. Additionally or alternatively, the similarity criteria can include having a quantity of N sub-fingerprints that match a reference song, where a sub-fingerprint matches a reference song if a set of M consecutive keys match the reference song, where N and M are integers. For instance, N can be a quantity of sub-fingerprints corresponding to a thirty-second interval of the sample audio file. If it is determined that there is at least one similar reference audio file (Y at reference numeral 712), then at reference numeral 714, the at least one similar reference audio file is identified. Returning to reference numeral 712, if it is determined that there are no similar reference audio files (N at reference numeral 712), then the methodology terminates.

FIG. 8 illustrates an example methodology 800 for audio identification using ordinal transformations in accordance with various aspects described in this disclosure. At reference numeral 802, a set of fingerprints for respective reference audio files are obtained, acquired, or otherwise received (e.g., using the identification component 108). Each fingerprint can include a set of sub-fingerprints. At reference numeral 804, a set of reference keys is generated for each fingerprint (e.g., using the reference key component 306). For example, in one implementation, the fingerprints (or sub-fingerprints) are divided into a set of keys based on a set of key generation criteria. As discussed, the key generation criteria can include but is not limited to a predetermined quantity of keys or a predetermined key size.

At reference numeral 806, the reference keys are inserted into corresponding hash table bins in a set of hash tables (e.g., using the reference key component 306). For example, if a first reference song has a key value K for a first hash table, then the first reference song is inserted in bin K in the first hash table. If the first reference song has a key value C for a second hash table, then first reference song is inserted into bin C in the second hash table. The quantity of bins in a hash table is equal to a range of possible values of a key. For instance, for a 32-bit key, there can be 2^32 bins. At reference numeral 808, respective keys for a sample audio file (e.g., audio file 104) are used to lookup reference audio files using the hash tables (e.g., using the identification component 108), and identify any similar reference audio files.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms as described for various embodiments of this disclosure.

Figure 9:
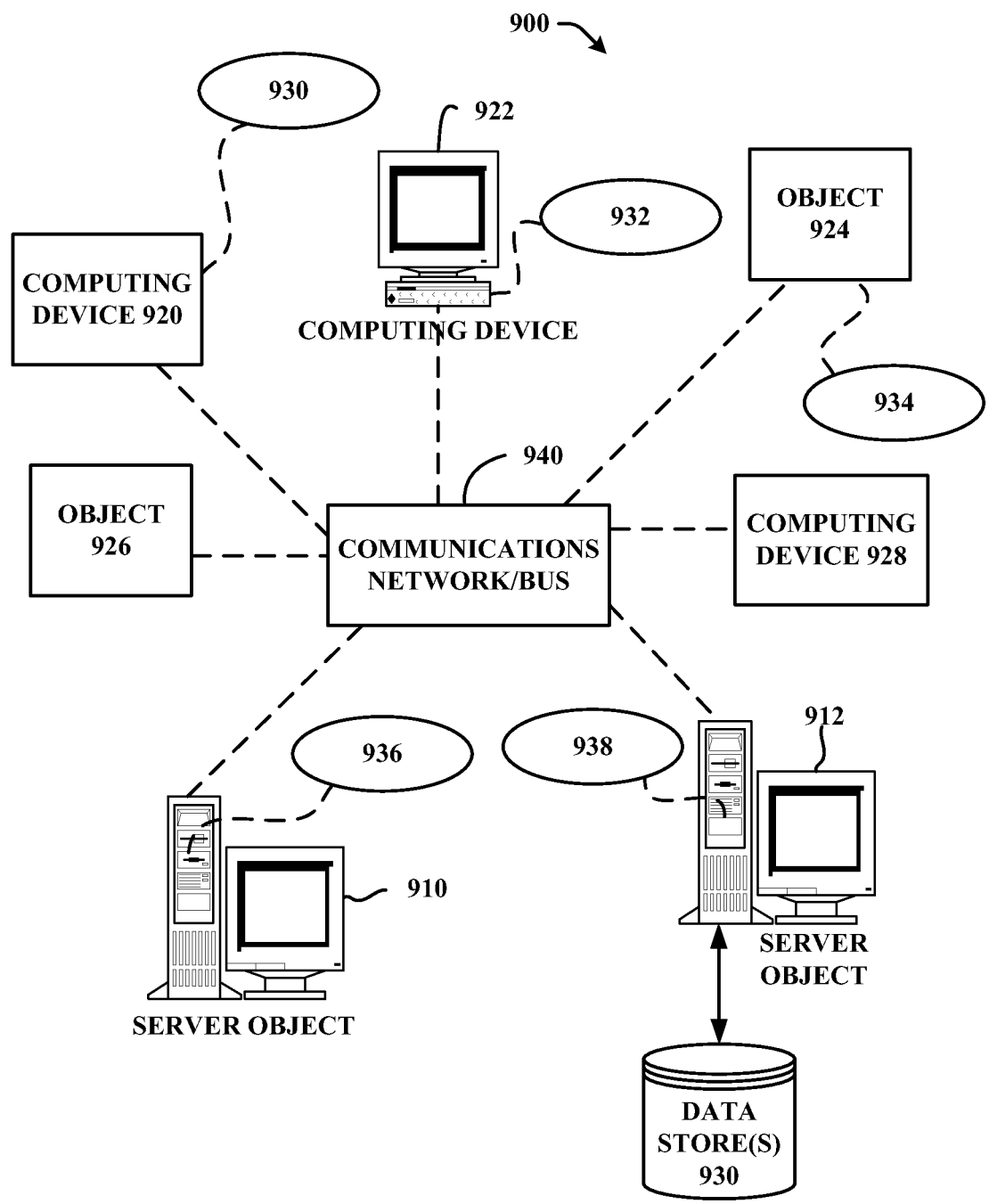
FIG. 9 is a block diagram representing an exemplary non-limiting networked environment in which the various embodiments can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 99, 912, etc. and computing objects or devices 920, 922, 924, 926, 928, etc. may comprise different devices, such as personal data assistants (PDAs), audio/video devices, mobile phones, MP3 players, personal computers, tablets, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 99, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
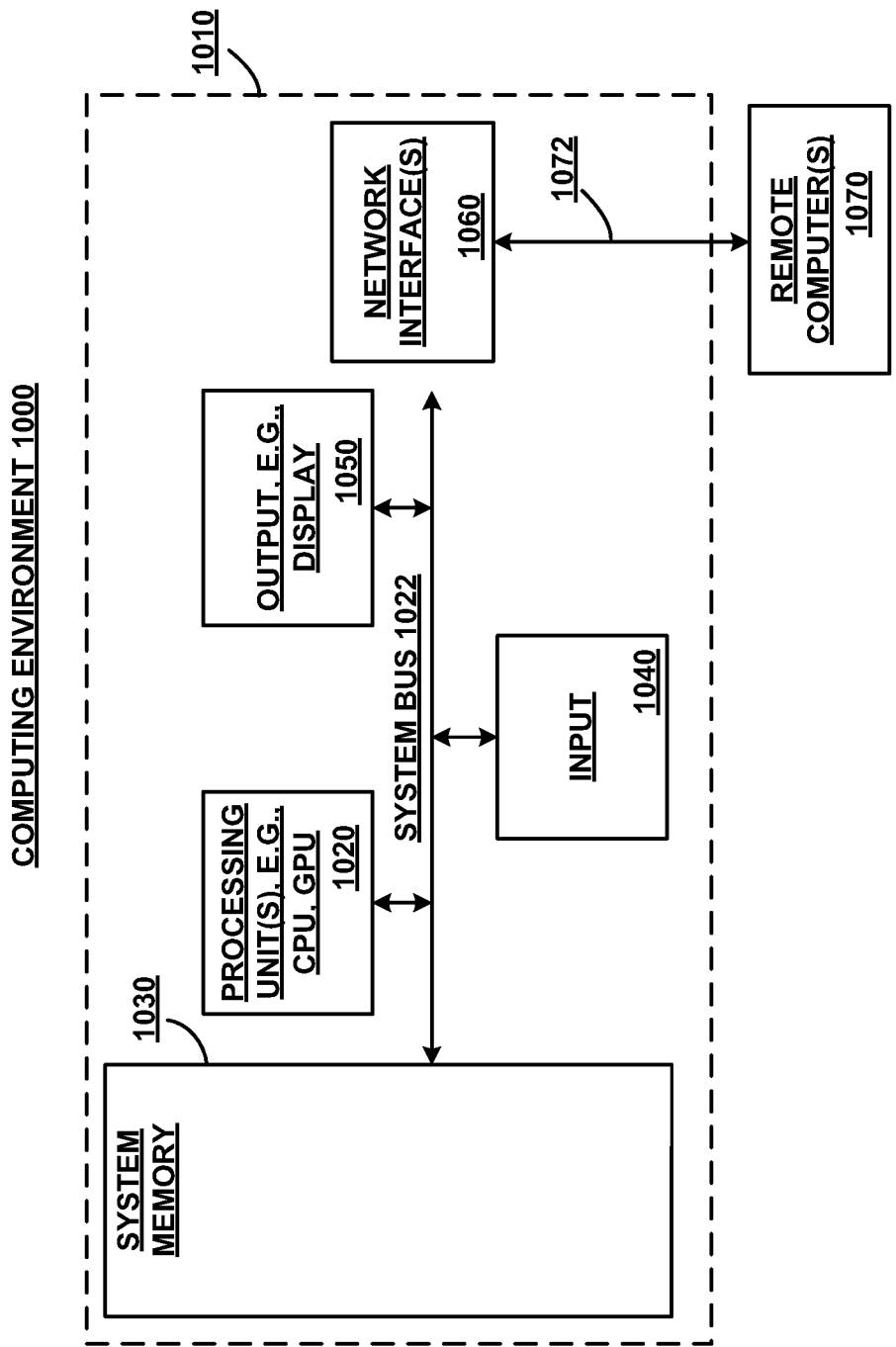
FIG. 10 is a block diagram representing an exemplary non-limiting computing system or operating environment in which the various embodiments may be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A computer recognition system for performing media matching, comprising:
   a memory storing computer executable components; and
   a processor configured to execute the following computer executable components stored in the memory:
      a receipt component that receives a sample audio file containing unknown audio content uploaded to a media hosting service using a computer network;
      a vector component that computes a set of vectors using auditory feature values identified in the sample audio file;
      a hash component that employs a winner take all hash function for non-binary vectors to generate sub-fingerprints for corresponding respective vectors in the set of vectors, wherein the winner take all hash function for each vector X in the set of vectors:
         generates a set of m permutations $\Theta$, where m is an integer;
         for each permutation $\Theta_i$ where i is an integer from 0 to m−1:
            permutates elements of vector X according to $\Theta_i$ to generate permuted vector X' having K non-binary elements, where K is an integer,
            initializes sparse code $c_{xi}$ to 0, and
            sets $c_{xi}$ to an element of maximum value in permuted vector X'; and
         sets subfingerprint $C_x$ equal to $(c_{x0}, c_{x1}, \ldots c_{xm-1})$; and
      an identification component that:
         identifies at least one reference audio file containing known audio content similar to the sample audio file using the sub-fingerprints, the at least one reference audio file stored in a database in communication with the media hosting service;
         determines an identity of the audio content contained in the sample audio file responsive to the identified at least one reference audio file; and
         detects that the audio content contained in the sample audio file is a transformed performance of the known audio content responsive to the determined identity.

2. The system of claim 1, further comprising a key component that generates a set of keys using the sub-fingerprints based on a set of key generation criteria.

3. The system of claim 2, wherein the key generation criteria includes at least one of a predetermined quantity of keys or a predetermined key size.

4. The system of claim 2, wherein the identification component indexes respective keys in the set of keys into a set of hash tables, and identifies the at least one reference audio file that is similar to the sample audio file based on a set of similarity criteria.

5. The system of claim 1, wherein the vector component computes the set of vectors at a fixed periodic interval.

6. The system of claim 5, wherein the fixed periodic interval is every 0.24 seconds.

7. The system of claim 1, further comprising a transformation component that performs at least one transformation on the set of auditory feature value vectors.

8. The system of claim 7, wherein the at least one transformation includes smoothing at least one vector in the set of auditory feature value vectors by averaging the at least one vector with a subset of vectors preceding the at least one vector in the set of auditory feature value vectors.

9. The system of claim 7, wherein the at least one transformation includes a two-dimensional wavelet transformation.

10. The system of claim 1, wherein the set of vectors include at least one of a set of intervalgrams, a set of spectrograms, or a set of chromagrams.

11. A method of performing media matching, comprising:
    receiving, by a system including a processor, a sample audio file containing unknown audio content uploaded to a media hosting service using a computer network;
    computing, by the system, a set of vectors using auditory feature values identified for the sample audio file;
    employing, by the system, a winner-take-all hash function for non-binary vectors to generate sub-fingerprints corresponding to respective vectors in the set of vectors, wherein employing the winner take all hash function for each vector X in the set of vectors comprises:
       generating a set of m permutations $\Theta$, where m is an integer;
       for each permutation $\Theta_i$ where i is an integer from 0 to m−1:
          permutating elements of vector X according to $\Theta_i$ to generate permutated vector X' having K non-binary elements, where K is an integer,
          initializing sparse code $c_{xi}$ to 0, and
          setting $c_{xi}$ to an element of maximum value in permutated vector X'; and
       setting subfingerprint $C_x$ equal to $(c_{x0}, c_{x1}, \ldots c_{xm-1})$; and
    identifying, by the system, at least one reference audio file containing known audio content similar to the sample audio file based on a set of similarity criteria using the sub-fingerprints, the at least one reference audio file stored in a database in communication with the media hosting service;
    determining an identity of the audio content contained in the sample audio file responsive to the identified at least one reference audio file; and
    detecting that the audio content contained in the sample audio file is a transformed performance of the known audio content responsive to the determined identity.

12. The method of claim 11, wherein the identifying the at least one reference audio file similar to the sample audio file based on a set of similarity criteria using the sub-fingerprints comprises:
    generating a set of keys using the sub-fingerprints based on a predetermined quantity of keys.

13. The method of claim 11, wherein the identifying the at least one reference audio file similar to the sample audio file based on a set of similarity criteria using the sub-fingerprints comprises:
    generating a set of keys using the sub-fingerprints based on a predetermined key size.

14. The method of claim 11, wherein the identifying the at least one reference audio file similar to the sample audio file based on a set of similarity criteria using the sub-fingerprints comprises generating a set of keys using the sub-fingerprints, and wherein the method further comprises indexing respective keys in the set of keys into hash tables.

15. The method of claim 11, further comprising performing, by the system, at least one of smoothing at least one vector in the set of vectors by averaging the at least one vector with a subset of vectors preceding the at least one vector in the set of auditory feature value vector.

16. The method of claim 11, wherein the set of vectors include at least one of a set of intervalgrams, a set of spectrograms, or a set of chromagrams.

17. A non-transitory computer-readable medium having instructions stored thereon computer executable instructions that, in response to execution, cause a system including a processor to perform operations comprising:
  receiving a sample audio file containing unknown audio content uploaded to a media hosting service using a computer network;
  computing a set of vectors using auditory feature values identified for the sample audio file;
  employing a winner-take-all hash function for non-binary vectors to generate sub-fingerprints corresponding to respective vectors in the set of vectors, wherein employing the winner take all hash function for each vector X in the set of vectors comprises:
    generating a set of m permutations Θ, where m is an integer;
    for each permutation $\Theta_i$, where i is an integer from 0 to m−1:
      permutating elements of vector X according to $\Theta_i$ to generate permuted vector X' having K non-binary elements, where K is an integer,
      initializing sparse code $c_{xi}$ to 0, and
      setting $c_{xi}$ to an element of maximum value in permutated vector X'; and
    setting subfingerprint $C_x$ equal to ($c_{x0}, c_{x1}, \ldots c_{xm-1}$); and
  identifying at least one reference audio file containing known audio content similar to the sample audio file based on a set of similarity criteria using the sub-fingerprints, the at least one reference audio file stored in a database in communication with the media hosting service;
  determining an identity of the audio content contained in the sample audio file responsive to the identified at least one reference audio file; and
  detecting that the audio content contained in the sample audio file is a transformed performance of the known audio content responsive to the determined identity.

18. The non-transitory computer-readable medium of claim 17, wherein the identifying the at least one reference audio file similar to the sample audio file based on a set of similarity criteria using the sub-fingerprints comprises:
  generating a set of keys using the sub-fingerprints based on a predetermined quantity of keys.

19. The method of claim 17, wherein the set of vectors include at least one of a set of intervalgrams, a set of spectrograms, or a set of chromagrams.

20. The system of claim 1, wherein identifying the at least one reference audio file comprises:
  generating a set of reference keys for known audio content contained by a reference audio file;
  inserting the set of reference keys for the known audio content into corresponding hash table bins in a set of hash tables;
  generating a set of sample keys from the sub-fingerprints;
  indexing the keys of the set of sample keys into corresponding hash table bins in the set of hash tables; and
  determining that the reference audio file contains known audio content similar to the unknown audio content contained in the sample audio file responsive to at least a threshold number of the keys of the set of sample keys indexing to hash table bins to which keys of the set of reference keys were inserted.

21. The system of claim 1, wherein m is an integer greater than one.

22. A method of performing media matching, comprising:
  receiving, by a system including a processor, a sample audio file containing unknown audio content uploaded to a media hosting service using a computer network;
  computing, by the system, a set of vectors using auditory feature values identified for the sample audio file;
  employing, by the system, a winner-take-all hash function for non-binary vectors to generate sub-fingerprints corresponding to respective vectors in the set of vectors, wherein employing the winner take all hash function for each vector comprises:
    for each of a plurality of different permutations:
      permutating elements of the vector according to the permutation to generate a permutated vector, and
      selecting an element of maximum value in the permutated vector; and
    generating a sub-fingerprint from the selected elements; and
  identifying, by the system, at least one reference audio file containing known audio content similar to the sample audio file based on a set of similarity criteria using the sub-fingerprints, the at least one reference audio file stored in a database in communication with the media hosting service;
  determining an identity of the audio content contained in the sample audio file responsive to the identified at least one reference audio file; and
  detecting that the audio content contained in the sample audio file is a transformed performance of the known audio content responsive to the determined identity.

* * * * *